(12) United States Patent
Stupar

(10) Patent No.: US 6,718,913 B1
(45) Date of Patent: Apr. 13, 2004

(54) ANIMAL GROOMING BRUSH

(76) Inventor: Joe A. Stupar, 836 Ramona St., Ramona, CA (US) 92065

( * ) Notice: Subject to any disclaimer, the term of this patent is extended or adjusted under 35 U.S.C. 154(b) by 0 days.

(21) Appl. No.: 10/251,373

(22) Filed: Sep. 19, 2002

(51) Int. Cl.$^7$ ............................................. A01K 13/00
(52) U.S. Cl. ...................... 119/602; 119/664
(58) Field of Search .................. 119/602, 603, 119/612, 615, 619, 652, 664, 628, 621; 15/160, 106, 107, 110

(56) References Cited

U.S. PATENT DOCUMENTS

| | | | | |
|---|---|---|---|---|
| 390,484 A | * | 10/1888 | Lawrence .................... | 119/628 |
| 949,868 A | * | 2/1910 | Whetstone ................... | 119/631 |
| 1,185,876 A | * | 6/1916 | Colgan ........................ | 119/628 |
| 1,398,864 A | * | 11/1921 | Kelly .......................... | 15/171 |
| 2,238,603 A | * | 4/1941 | Runnels ....................... | 132/120 |
| 3,151,346 A | * | 10/1964 | Gray ........................... | 15/187 |
| D200,761 S | * | 4/1965 | Hamm ........................ | D4/114 |
| 4,143,667 A | * | 3/1979 | Peilet .......................... | 401/28 |
| 4,202,139 A | * | 5/1980 | Hong et al. .................. | 451/524 |
| 4,543,913 A | * | 10/1985 | Wilkeson .................... | 119/603 |
| D284,121 S | * | 6/1986 | Kelly .......................... | D30/158 |
| 4,617,875 A | * | 10/1986 | Holland ....................... | 119/603 |
| 4,902,154 A | * | 2/1990 | Valenza ....................... | 401/132 |
| 4,995,344 A | * | 2/1991 | Olson .......................... | 119/603 |
| 5,312,197 A | * | 5/1994 | Abramson .................... | 401/6 |
| 5,442,829 A | * | 8/1995 | Summers ..................... | 15/106 |
| 5,573,022 A | * | 11/1996 | Winters ....................... | 132/325 |
| 5,822,823 A | * | 10/1998 | Polzin et al. ................ | 15/210.1 |
| 5,823,145 A | * | 10/1998 | Hingiss ....................... | 119/603 |
| 6,024,052 A | * | 2/2000 | Efaw ........................... | 119/625 |
| 6,367,421 B1 | * | 4/2002 | Deacon ........................ | 119/603 |
| 6,427,633 B1 | * | 8/2002 | Ogden ......................... | 119/628 |
| 6,481,443 B1 | * | 11/2002 | Moore-Johnson et al. .... | 132/73 |
| 2002/0096125 A1 | * | 7/2002 | Fong ........................... | 119/664 |

* cited by examiner

Primary Examiner—Yvonne R. Abbott
(74) Attorney, Agent, or Firm—Thomas J. Tighe; Howard C. Tarr

(57) ABSTRACT

A conduit network on a bristle face of a brush communicates with a supply of cleansing or rinsing effluent under pressure, and dispenses the effluent generally uniformly over a wide area of the bristle face through distributed outlet holes. A preferred quick connector couples the network to the effluent supply. A valve controls the rate of flow into the network. Control of brush movement during washing and grooming is facilitated by: an adjustable strap securing a user's hand to a top control face, a finger wall projecting from the control face including finger stops, a palm heel catch, liquid drain-off channels which also knurl the control face for better gripping, and a preferred length allowing a user's fingertips to overlap the front of the brush.

12 Claims, 4 Drawing Sheets

ANIMAL GROOMING BRUSH

BACKGROUND OF THE INVENTION

This invention relates in general to brushes used for grooming animals and more particularly to brushes used for grooming pets and stock animals, especially horses.

It is important that animals be washed and groomed. In addition to the improvement in an animal's appearance such care provides, it also helps to maintain the animal's general health. Frequent or periodic washing and grooming removes insect pests. It removes tangled and matted hair which can harbor such pests and which can get caught on an object, causing the hair or even flesh to be torn. It reduces odor which attracts a variety of dangerous and annoying insect pests. It also enables the animal's skin and coat to be examined for indications of damage which need treatment and potentially damaging conditions can be readily found, allowing preventive measures to be taken.

While brushes of various types have long been used for grooming animals, until now the application of water to wash the animal had to be done separately, usually by pouring from a bucket or squirting with a hose. This added time and effort to the task of washing and grooming and by the time a groomer was able to use a brush, the water had already drained away from the area being groomed. Usually, in an attempt to be more efficient, the entire animal was initially wetted down, causing it to become cold and uncomfortable, particularly during cold periods, longer than necessary, since only a smaller area of the animal could be washed at a time. Also, when more water was needed, it had to be applied by someone else, by using a hose in another hand, or by stopping and applying water.

The grooming brush of this invention allows water to be applied through the brush where and when needed to wash the animal. The invention includes a hose coupling on the brush to allow it to be quickly connected to a quick connect/disconnect hose adapter and contains a plurality of conduits, each with a plurality of openings defined along the conduits to provide water under pressure so that the brush can spray water onto the area being washed.

Other advantages and attributes of this invention will be readily discernable upon a reading of the text hereinafter.

SUMMARY OF THE INVENTION

An object of this invention is to provide a washing and grooming brush which includes a conduit network on a bristle face of the brush which communicates with a supply of cleansing or rinsing effluent under pressure, and dispenses the effluent generally uniformly over a wide area of the bristle face through distributed outlet holes.

A further object of this invention is to provide a brush as described in the preceding paragraph with additional features for facilitating control of brush movement during operation, the features including an adjustable strap securing a user's hand to a top control face and liquid drain-off channels which also knurl the control face for better gripping.

A further object of this invention is to provide a brush as described in the preceding paragraph with additional features for facilitating control of brush movement during operation, the features including a finger wall with finger stops, as described below, projecting from the control face.

A further object of this invention is to provide a brush as described in the preceding paragraphs with additional features for facilitating control of brush movement during operation, the features including a palm heel catch to help prevent the user's hand from slipping off of the brush while pulling the brush backward.

A further object of this invention is to provide a brush as described in the preceding paragraphs with additional features for facilitating control of brush movement during operation, the features including a preferred length allowing a user's fingertips to overlap the front of the brush.

A further object of this invention is to provide a brush as described in the preceding paragraphs which can be quickly connected or disconnected to an effluent supply hose, e.g. a water hose.

An additional object of this invention is to provide a brush described in the preceding paragraphs which includes an easily operated valve for controlling the rate of flow of effluent into the brush.

These objects, and other objects expressed or implied in this document, are accomplished by

DESCRIPTION OF THE PREFERRED EMBODIMENT

Figure 1:
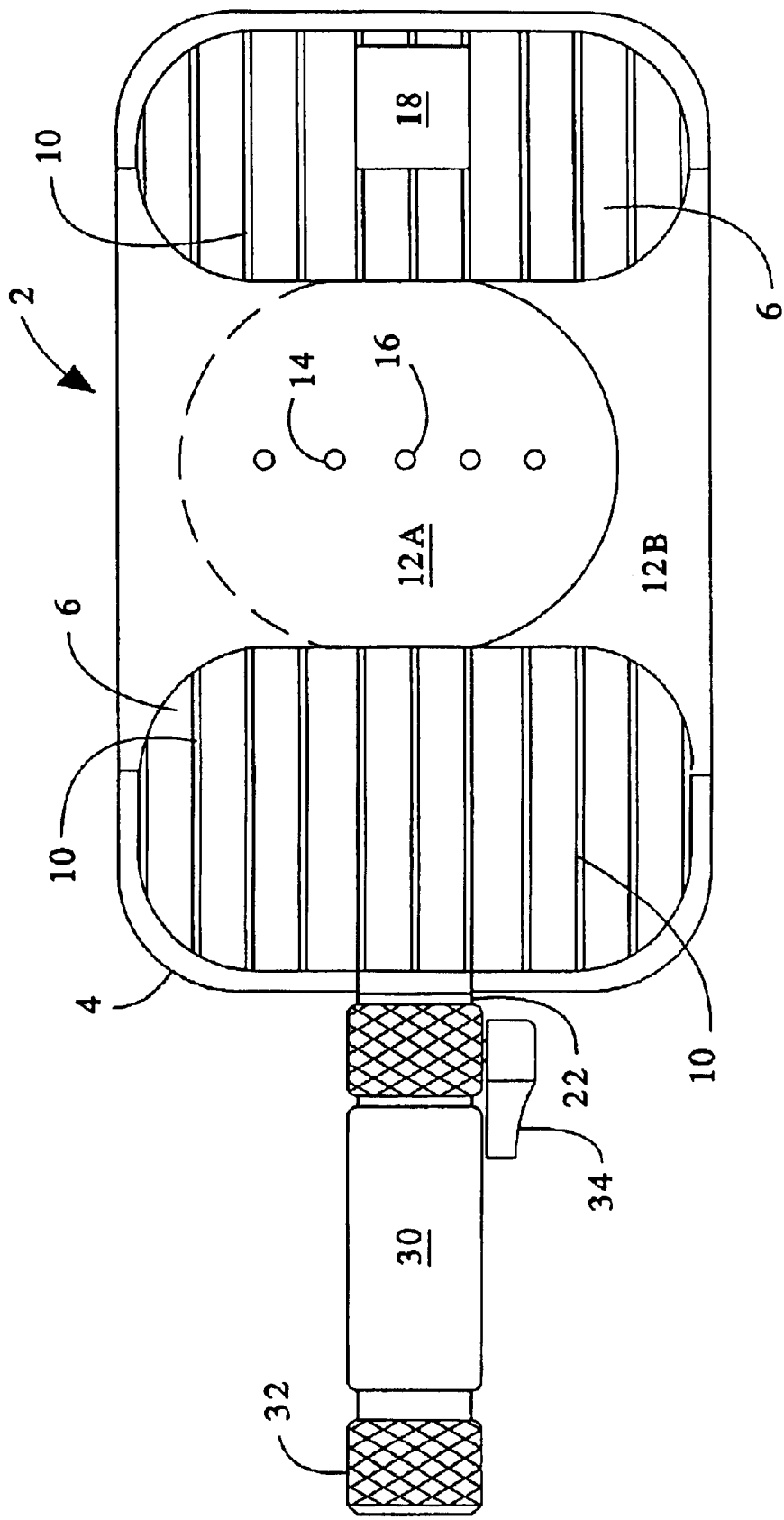
FIG. 1 is a top view of the invention.

Referring to FIGS. 1, 3, 4 and 5, the animal grooming brush of this invention, generally designated 2, is illustrated to include a squat body 4 having opposite, generally planar, broad faces: a "top" face 6 and a "bottom" face 8. (As used herein, the terms "top", "bottom", "front", "back" and the like are arbitrarily selected directional references used solely to assist in the description of the preferred embodiment, and they should not be taken as indications of a necessary orientation of this invention.) In operation, the top face 6, with certain other features as described below, is the control surface, i.e., the surface by which a user controls movement of the brush, and the opposite bottom face 8 is the bristle and liquid dispensing face.

Referring to FIGS. 1, 3, 4 and 5 again, a plurality of relatively narrow open channels 10, preferably but not necessarily evenly spaced apart, are defined longitudinally, from back to front, in the top face 6 of the brush body 4. Opposing straps, 12A and 12B, extending from opposite lateral sides of the top face are used to snugly couple a user's hand, palm down, to the top face. The straps can be adjustably connected to adapt to a wide range of hand sizes. As illustrated, one strap 12A defines a plurality of longitudinally uniformly spaced, holes 14 of uniform size, preferably at least five, and the other strap 12B has a plurality of similarly spaced, uniformly sized knobs 16, preferably three, projecting from a side facing the holed strap 12A. In operation, the set of knobs are aligned with a selected set of holes and the knobs are then forcibly pressed into the holes and held therein by friction to connect the straps together. The straps can be adjusted to become tighter or looser on a user's hand by moving the set of knobs into a next set of matching holes. The knobs may be affixed to their strap by any suitable means but preferably they are formed as an integral part of the strap when the strap is made. When a user's hand is secured between the body 4 and the straps, the brush is in effect an attachment of the hand and is thereby more easily controlled by the hand.

In operation, the channels 10 improve a user's hand control of the brush two ways: they knurl the top face 6 to provide resistance to lateral movement of the brush relative to the user's hand, and they drain away any water build-up between the user's hand and the top face 6 thereby minimizing slippage between the hand and the brush due to the lubricating effect of the water. The resistance is due to the flesh of the user's hand meshing with the channels. When the coupled hand applies downward pressure to the brush, the hand's palm flesh is pressed slightly into the channels causing narrow ribs of flesh to protrude into the channels. This slight meshing of the channels with hand flesh provides resistance to lateral movement of the brush relative to the hand, thus providing the hand greater lateral control of the brush. Also, the channels 10 readily drain water away from the top face 6 of the brush during use, keeping water on the top face to a minimum and thereby minimizing water-caused longitudinally slippage. Thus, the channels greatly improve the user's hand control of the brush by minimizing water-caused slippage and further resisting lateral slippage particularly during lateral strokes of the brush.

Referring to FIGS. 1, 3–5, to provide additional control of the brush by a user's hand, a longitudinally running flange 18 projects normally from the top face 6. Preferably, but not necessarily, the flange is centered laterally and extends rearwardly along a longitudinal axis of the brush from a point proximate a front end of the brush. The purpose of the flange is to provide a finger wall for further lateral control of the brush. In operation, the wall is disposed between fingers of a user's hand and provides a control surface against which the fingers can press to exert lateral force in either direction against the brush. Preferably the wall flange is one to one and a half inches long and is disposed to at least partially engage the distal and middle phalanges of the user's fingers straddling the flange, but it should be understood that the length and disposition of the wall flange can be longer or shorter, and disposed further up or down relative to straddling fingers. Projecting laterally in opposite directions from a top margin of the wall flange are two lateral flanges, 19A and 19B, which act as finger stops. In operation, as a finger is exerting force against the wall flange 18 the finger will tend to slide up the wall, especially with water present, and in the absence of the lateral flanges could even slip over the wall. The lateral flanges, 19A and 19B, act as stops to prevent vertical slippage between the fingers and the wall flange. They also act as surfaces against which the fingers can exert vertical force for lifting the brush. As illustrated, the wall flange and finger stop flanges form generally a "T" in cross-section, and preferably inside corners of the T are rounded to allow more contact and comfort for the fingers. Preferably the space between the lateral flanges, 19A and 19B, and the top face 6 of the brush is sufficient to allow the user's fingers to comfortably fit against the wall flange 18, allowing the fingers to exert both lateral and upward force against the T to provide additional control of the brush.

Figure 3:
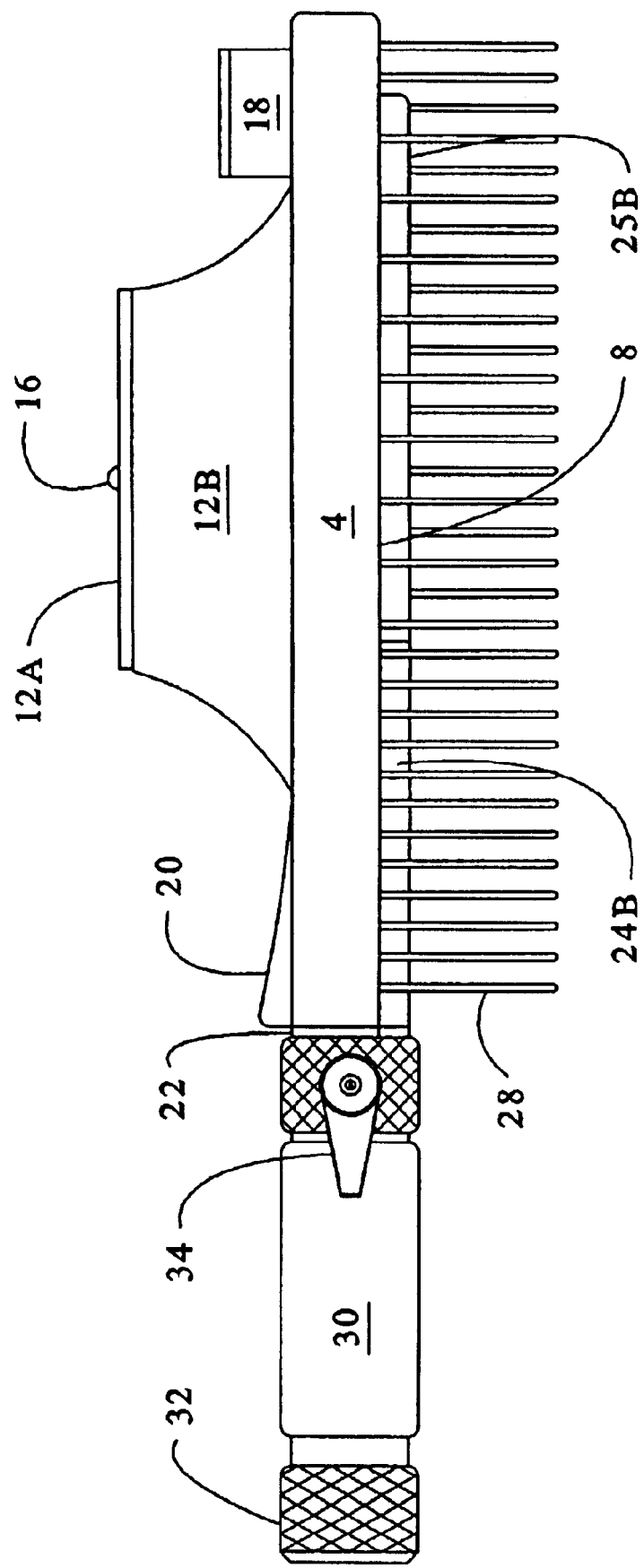
FIG. 3 is a side elevation view of the invention.

Referring to FIG. 3, proximate the rear of the brush the top face 6 is preferably inclined to form a palm heel catch 20. The incline is preferably slightly concave to generally match and fit the curvature of a palm heel, and extends laterally across the rear of the brush to generally match the width and form of a palm heel. The incline of the catch 20 extends approximately one quarter of the length of the brush, its highest point being at the rear of the brush. The heel catch provides an additional means of controlling the brush particularly when the brush is being pulled backwardly. The catch 20 provides a raised surface which reacts against a user's palm heel and enables the user to pull the brush backward against very significant resistance (e.g. matted animal hair) without the user's hand slipping off the brush.

When a user's hand is properly strapped onto the brush the heel of the palm will abut the palm heel catch 20 and the user's finger tips will preferably extend just beyond the front of the brush, for normally sized adult hands. The extended fingers gripping the front of the body 4 further facilitates pulling the brush backward against resistance, as is encountered during grooming when pulling the brush back through an animal's coat, without the hand slipping off the brush.

Figure 2:
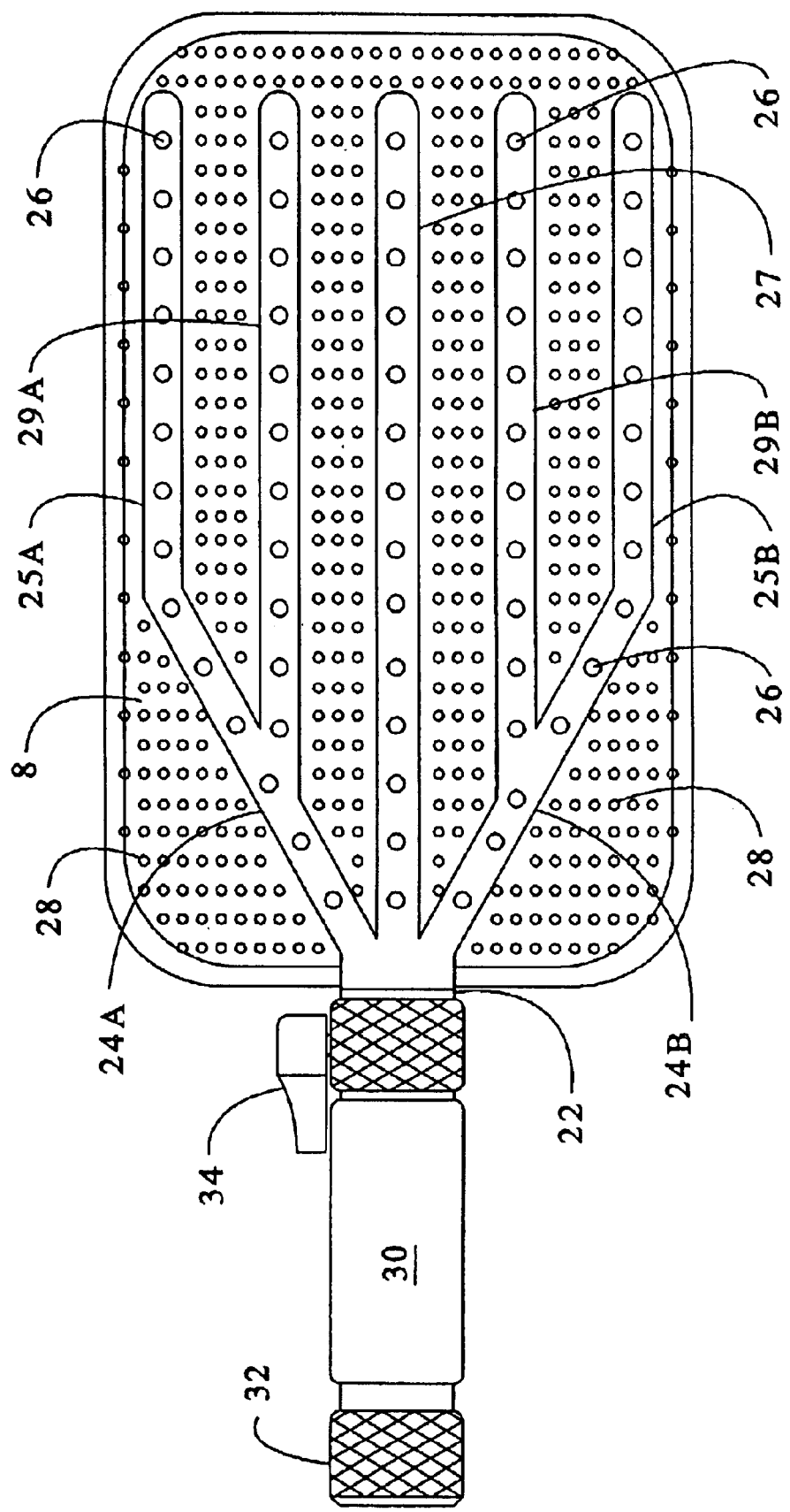
FIG. 2 is a bottom view of the invention.
Figure 5:
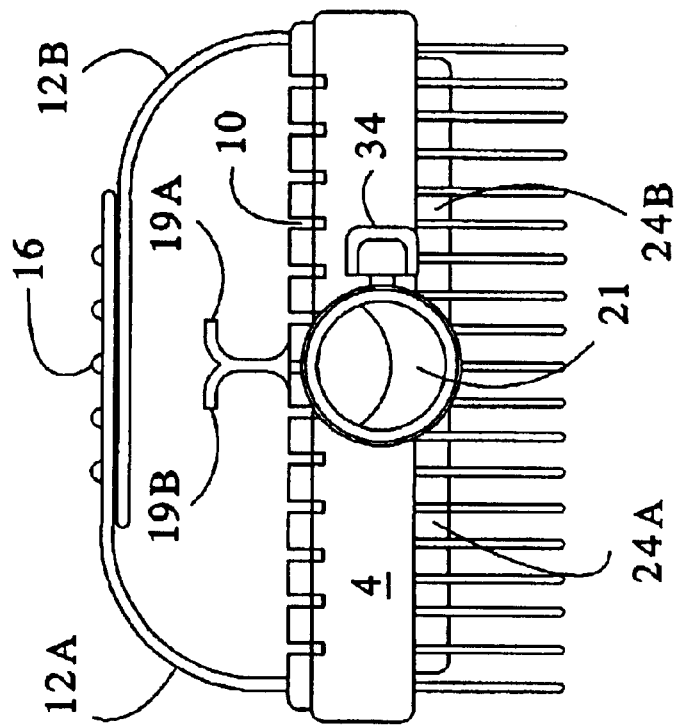
FIG. 5 is a rear elevation view of the invention.
Figure 4:
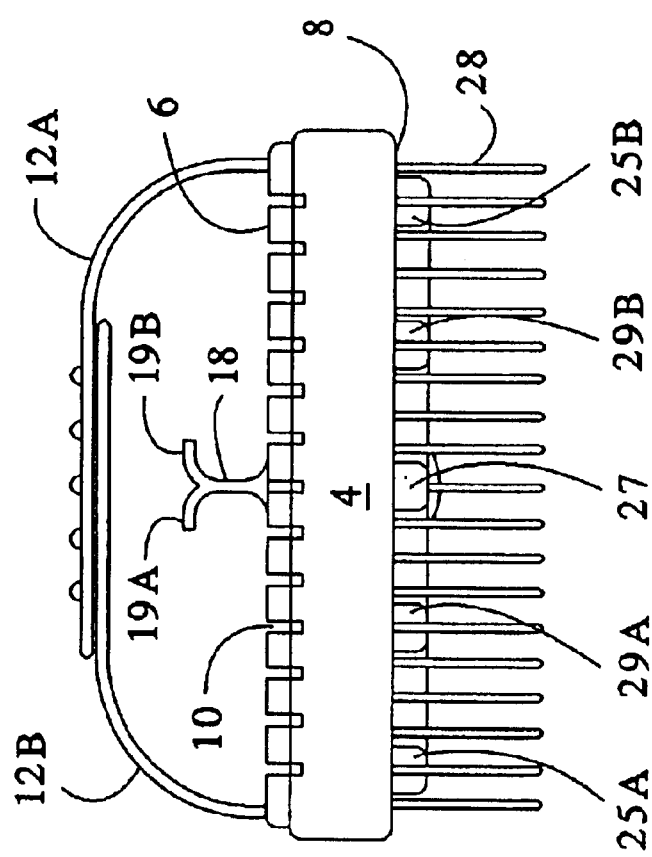
FIG. 4 is a front elevation view of the invention.

Referring to FIGS. 2, 4 and 5, a liquid inlet 21 is defined preferably by a threaded male coupler 22 which projects centrally from the rear side of the body 4 of the brush. Defined by the body 4 and communicating with the water inlet is a conduit network for distributing a liquid from the inlet to a widely distributed plurality of outlet holes 26 all defined by branches in the conduit network. In operation, the liquid will typically comprise water or a mixture of water and some cleansing agent,.e.g. soap suitable for animals. As illustrated, the conduit network is in the shape of a fork with five parallel tines running lengthwise along the brush almost to the front end of the brush. The "fork" includes two branches, 24A and 24B, angled in opposite directions away from the inlet and extending to respective outermost "tines", i.e., conduit branches, 25A and 25B, disposed near opposite longitudinal margins of the brush. The fork also includes a laterally central conduit branch 27 extending from the inlet, and two branches, 29A and 29B, disposed on opposite sides of the central branch each disposed intermediate the central branch and a respective outermost branch and each intersecting respective angled branches, 24A and 24B. As illustrated, the walls of the conduit branches protrude from the bottom face 8 of the body 4 to accommodate channels of sufficient diameter to carry as much effluent as needed for an application, and to reduce the weight of the body. Each protruding conduit wall defines a plurality of spaced outlet holes 26 all facing away from the brush. Preferably the holes are of uniform size and are uniformly spaced along their respective conduit walls. When the brush is connected to a pressurized liquid source, the conduits communicate the liquid to the holes from which the liquid is sprayed. Projecting generally perpendicular from the bottom face 8 are a plurality of bristles 28. As illustrated the bristles are in uniformly spaced rows and columns with gaps in the bristles coincident with the conduit branches. The bristles are preferably stiff, approximately 1"×3/32" tapered to 1/16". The dispersed dispositions of the conduits and the holes among the bristles produces an effluent distribution which is generally uniformly throughout the bristles.

Referring to FIGS. 1–3 and 5, an elongated hollow handle 30 is preferably threadably engaged with the brush inlet coupler 22. The handle includes a quick connect/disconnect adapter 32 at its distal end for connection to a liquid supply hose equipped with a mating quick connect/disconnect connector. The handle further includes a valve for controlling the flow of liquid into the brush inlet. As illustrated the valve mechanism (not shown) is disposed within the handle at the mouth of the inlet, the valve being controlled by an external lever 34. Preferably the valve is a peacock.

In operation, the handle 30 is connected to, e.g., a water hose by means of the quick adapter 32. The flow of water into the brush conduits is controlled by lever 34. With the brush strapped to a user's hand and the control valve open, an animal's coat can be wetted while brushing the coat or by simply holding the brush, bristles down, over the coat. The wetted area can be lathered by applying soap, and with the water turned off the brush can be used to brush the lather into and through the coat. The water can be turned on again and the soap can be rinsed away while continuing to brush the coat.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

What is claimed is:

1. A washing and grooming brush comprising:
   (a) a body including:
       (1) a bristle face, and
       (2) an opposite control face for applying a user's hand, palm down, to control movement of the brush over an animal's coat;
   (b) the control face being knurled for resisting movement of the brush relative to the hand;
   (c) an effluent conduit network on the bristle face;
   (d) a plurality of outlet holes defined by the network for dispensing effluent from the bristle face; and
   (e) a coupler for communicating effluent from an effluent supply to the network.

2. The brush according to claim 1 wherein the network covers a substantial area of the bristle face.

3. The brush according to claim 1 further comprising a finger wall projecting normally from the control face and disposed to be between two fingers of the user's hand when said hand is applied to the control face.

4. The brush according to claim 3 further comprising a finger stop atop the finger wall.

5. The brush according to claim 1 wherein the control face further defines a plurality of open channels for draining liquid from atop the control face.

6. A washing and grooming brush comprising:
   (a) a body including:
       (1) a bristle face, and
       (2) an opposite control face for applying a user's hand, palm down, to control movement of the brush over an animal's coat; and
   (b) an effluent conduit network on the bristle face, the network comprising:
       (1) an effluent inlet,
       (2) a plurality of conduit branches communicating with the inlet, the branches covering a substantial area of the bristle face, and
       (3) each branch including a plurality of spaced effluent outlet holes defined by said each branch for dispensing effluent from the bristle face.

7. The brush according to claim 6 further comprising a finger wall projecting normally from the control face and disposed to be between two fingers of the user's hand when said hand is applied to the control face.

8. The brush according to claim 7 further comprising a finger stop atop the finger wall.

9. A washing and grooming brush comprising:
   (a) a body including:
       (1) a bristle face, and
       (2) an opposite control face for applying a user's hand, palm down, to control movement of the brush over an animal's coat;
   (b) the control face defining a plurality of open channels for draining liquids from the control face;
   (c) an effluent conduit network on the bristle face;
   (d) a plurality of outlet holes defined by the network for dispensing effluent from the bristle face; and
   (e) a coupler for communicating effluent from an effluent supply to the network.

10. The brush according to claim 9 wherein the channels are sized and so disposed to resist movement of the brush relative to the hand.

11. The brush according to claim 9 further comprising a finger wall projecting normally from the control face and disposed to be between two fingers of the user's hand when said hand is applied to the control face.

12. The brush according to claim 11 further comprising a finger stop atop the finger wall.

* * * * *

UNITED STATES PATENT AND TRADEMARK OFFICE
CERTIFICATE OF CORRECTION

PATENT NO.   : 6,718,913 B1
DATED        : April 13, 2004
INVENTOR(S)  : Joe A. Stupar It is certified that error appears in the above-identified patent and that said Letters Patent is hereby corrected as shown below:

<u>Column 4,</u>
Line 59, reads "peacock" should be -- petcock --

Signed and Sealed this

Twenty-third Day of November, 2004

JON W. DUDAS
*Director of the United States Patent and Trademark Office*